(12) United States Patent
Voyatzakis et al.

(10) Patent No.: US 6,769,898 B1
(45) Date of Patent: Aug. 3, 2004

(54) DOUGH PRESS

(75) Inventors: Andrew D Voyatzakis, Carlisle, MA (US); George Athanasiadis, Lexington, MA (US)

(73) Assignee: Somerset Industries, Inc., N. Billerica, MA (US)

( * ) Notice: Subject to any disclaimer, the term of this patent is extended or adjusted under 35 U.S.C. 154(b) by 181 days.

(21) Appl. No.: 10/236,630

(22) Filed: Sep. 6, 2002

(51) Int. Cl.$^7$ .............................................. A21C 11/00
(52) U.S. Cl. ...................... 425/182; 425/318; 425/394; 425/412; 99/349; 426/496; 426/512
(58) Field of Search ................................ 425/182, 193, 425/318, 394, 404, 412; 99/349; 426/496, 512; 415/DIG. 3

(56) References Cited

U.S. PATENT DOCUMENTS

| | | | |
|---|---|---|---|
| 3,590,749 A | * 7/1971 | Burns et al. ................. | 425/195 |
| 4,060,365 A | 11/1977 | Duarte et al. | |
| 4,076,476 A | * 2/1978 | Ventura ....................... | 425/183 |
| 4,559,002 A | 12/1985 | Atwood | |
| 4,571,775 A | 2/1986 | Leonard | |
| 5,074,778 A | 12/1991 | Betts, Jr. et al. | |
| 5,417,149 A | 5/1995 | Raio et al. | |
| 5,469,779 A | * 11/1995 | Amore et al. ................ | 425/394 |
| 5,800,844 A | 9/1998 | Raio et al. | |
| 6,332,768 B1 | 12/2001 | Raio et al. | |

* cited by examiner

*Primary Examiner*—Robert Davis
*Assistant Examiner*—Thu Khanh T. Nguyen
(74) *Attorney, Agent, or Firm*—Altman & Martin (57) ABSTRACT

A manually operated dough press comprising a frame with a base and a housing, an upper platen having a working surface, and a lower platen attached to the base and having a working surface opposed to, substantially parallel to, and spaced from the upper platen working surface. The upper platen is attached to the lower end of a shaft that extends from the housing and mounted for reciprocating motion. A pair of mated interlocking components, one attached to the shaft and one attached to the housing, provide stability for vertical reciprocation. The drive mechanism includes a rack on the shaft interlocking component, a mating pinion fixed to an axle that is part of a handle that an operator uses to raise and lower the upper platen. Counterbalance for the upper platen/shaft is provided by a torsion spring assembly.

13 Claims, 5 Drawing Sheets

Prior Art

DOUGH PRESS

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to restaurant equipment, more particularly, to manual presses for producing flat sheets of dough.

2. Description of the Related Art

The purpose of a dough press is to flatten a quantity of dough to produce, for example, a pizza crust. A typical manual dough press has two horizontal platens with opposing working surfaces. Normally, the surfaces are flat, except when special shapes are desired, for example, to create a raised crust on a pizza. The lower platen is fixed vertically, but has designed to swing out from the press so that dough can be removed from or placed on the working surface. The upper platen is attached to a mechanism that moves the upper platen vertically, while remaining aligned and parallel with the lower platen. The mechanism is manually operated by a handle that extends from the front of the press. Raising and lowering the handle respectively raises and lowers the platen. In use, the lower platen is pivoted out from the press, a quantity of unformed dough is placed on the lower platen, and the lower platen is returned to its operative position. The operator lowers the handle, putting enough pressure on the handle to flatten the dough to the desired thickness. Optionally, the dough press may contain a stop whereby the upper platen's range of travel is limited. After the dough is pressed to the desired thickness, the handle is raised, the lower platen is swung out from the press and the now-flattened dough is removed.

Figure 2:
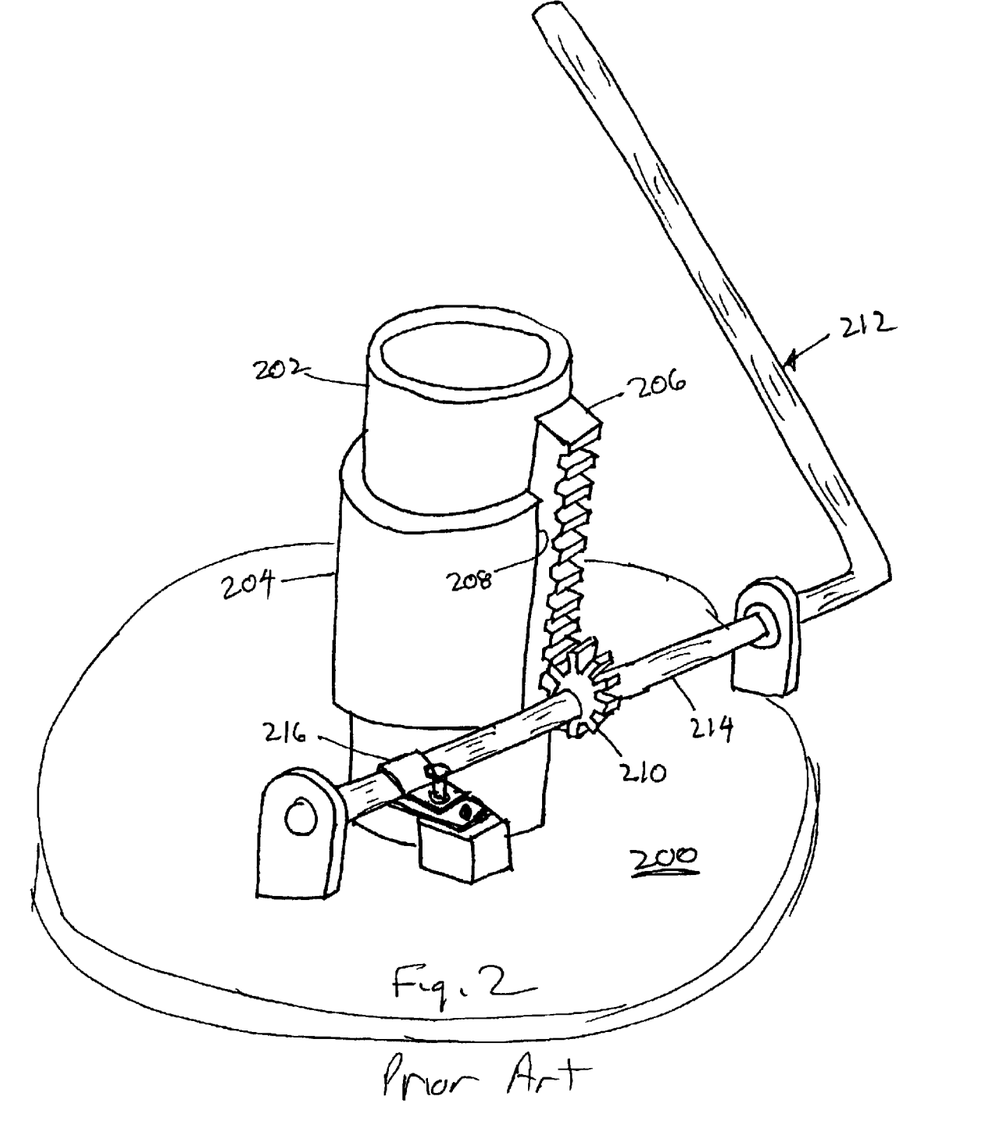
FIG. 2 is a perspective view of platen lowering and counterbalance mechanisms of dough presses of the prior art.

FIG. 2 illustrates two aspects of the platen-lowering mechanism of manual dough presses of the prior art. The upper platen 200 is attached to a shaft 202 that reciprocates within a cylinder 204 so that the platens remain aligned and parallel during operation. The shaft is driven manually by a rack and pinion, where the rack 206 is mounted vertically to the shaft 202. The rack 206 travels vertically through a slot 208 in the cylinder wall. The pinion 210 is attached to an axle 214 that is a portion of the handle 212. As the handle 212 is moved up or down, the pinion 210 rotates, causing the shaft 202 to reciprocate within the cylinder 204. In order to retain the upper platen in the position desired by the operator, a counterbalance mechanism is employed. A collar 216 is tightened around the axle portion 214 of the handle 212 to which the pinion 210 is attached. This has the effect of providing enough friction to overcome the weight of the platen 200 and shaft 202 to hold the platen 200 in the vertical position desired by the operator.

There are several shortcomings to this design. The shaft/cylinder combination must be lubricated on a regular basis in order work smoothly and not bind. With the shaft 202 attached directly to the upper platen 200, lubricant slides or is pushed down the shaft 202 and can end up on the platen 200. Because the working surface of the platen 200 is in contact with the dough being pressed, great care must be taken to make sure that the lubricant does not find its way to the dough press surface of the platen 200, otherwise the surface may become contaminated and, in turn, contaminate the dough.

Another shortcoming to the shaft/cylinder design is that the orientation of the upper platen 200 cannot be adjusted. In order to produce uniform and consist products, the platens must be parallel, otherwise one side of the resultant dough sheet will be thicker than the other. Because the lower platen is designed to be swung out from the machine, its main support is at the rim rather than in the center. Consequently, if too much or repeated pressure is put on the lower platen, it can eventually bend so that it is no longer parallel to the upper platen. And because the cylinder through which the shaft reciprocates is integral with the housing, the position and orientation of the shaft and upper platen cannot be adjusted to compensate for the now-tilted lower platen, rendering the machine useless.

Regarding the counterbalance mechanism, when raising the platen, the operator must overcome, not only the not insignificant weight of the platen, but the friction of the collar. In addition, the collar must be regularly adjusted as it or the axle wears. Eventually, the collar or handle must be replaced as one or the other wears out. Care must also be taken that lubricant does not contaminate the collar, and thereby reduce its effectiveness.

BRIEF SUMMARY OF THE INVENTION

An object of the present invention is to provide a manual dough press that requires less maintenance and cleaning than dough presses of the prior art in order to keep the food preparation surfaces from becoming contaminated.

Another object is to provide a manual dough press that is adjustable in order to compensate for deformations in the position and orientation of the lower platen.

A further object is to provide a manual dough press that provides a counterbalance mechanism the requires less maintenance and simpler adjustment than dough presses of the prior art.

A further object is to provide a manual dough press in which the upper platen requires much less effort to move up and down than dough presses of the prior art.

Briefly, the present invention is a dough press designed for manual operation that includes a frame with a base and housing, an upper platen with a working surface, a lower platen attached to the base and having a working surface opposed to, substantially parallel to, and spaced from the upper platen working surface, a shaft to which the upper platen is attached extending from the housing through an opening and mounted for reciprocating motion through the opening, a fixed interlocking component within and secured to the housing, a reciprocating interlocking component secured to the shaft within the housing, the reciprocating interlocking component being complementary to the fixed interlocking component and arranged for reciprocating movement within the fixed interlocking component, and a drive mechanism including a handle external to the housing for an operator to control the operation of the reciprocating movement of the shaft and the reciprocating interlocking component and the position of the upper platen relative to the lower platen.

The base and upper housing support the lower and upper platens, respectively, horizontally and in parallel and vertical alignment with each other. The base includes one or two cylindrical cavities in the front corners for accepting a cylindrical projection attached to the lower platen at its rim. The projection rotates within the cavity so that the lower platen can swing away from the base to expose the working surface.

The upper housing houses the mechanism by which the upper platen is lowered and raised. The upper platen is attached to the bottom of a shaft that reciprocates through a hole in the bottom of the upper housing. A interlocking component on the shaft reciprocates vertically within a complementary interlocking fixed in the housing. The profile of the interlocking components are such that they cannot move relative to each other except to reciprocate as described. The preferred profile is a dovetail, but other profiles providing the same function are contemplated. The interlocking component on the shaft is secured to the shaft by threaded studs extending from the interlocking component through elongated slots. The slots are oversized enough relative to the diameter of the threaded studs that the horizontal position and diagonal orientation can be adjusted to compensate for variations in the position and orientation of the lower platen.

A rack and pinion design drives the shaft vertically. The rack is mounted to the side of the shaft interlocking component and the pinion is rigidly fixed to an axle that is part of a handle that the operator uses to control the press. As the operator moves the handle up or down, the pinion, causing the shaft/upper platen to move up or down.

The present invention employs a torsion spring assembly as a counterbalance. The torsion spring assembly includes an elongated torsion member within a sleeve where the torsion member is fixed to one end of the sleeve. The other end of the torsion member is fixed within the housing. As the sleeve is twisted longitudinally, the stored spring energy in the torsion member increases. When the rotational force is removed from the sleeve, the stored energy is released, causing the torsion member to return to its normal, untwisted state. A terminator secures the fixed end of the torsion member to the housing. The terminator includes a device for adjusting the tension provided by the torsion spring assembly. A cam follower arm is fixed to and extends radially from the sleeve and a cam is secured to the shaft. A wheel at the end of the follower arm rides along the face of the cam, so that, as the shaft moves downwardly, stored spring energy increases. The amount of force provided by the torsion spring assembly as adjusted to offset the weight of the upper platen/shaft assembly so that the position of the upper platen is retained where placed by the operator. In addition, the torsion spring assembly provides a "power assist" for the operator in that raising the platen requires must less effort than dough presses of the prior art.

Optionally, the upper and/or lower platens are capable of heating the dough as it is being flattened. Contemplated methods include embedding heating elements in the platen and using a heating element external to and abutting the platen.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
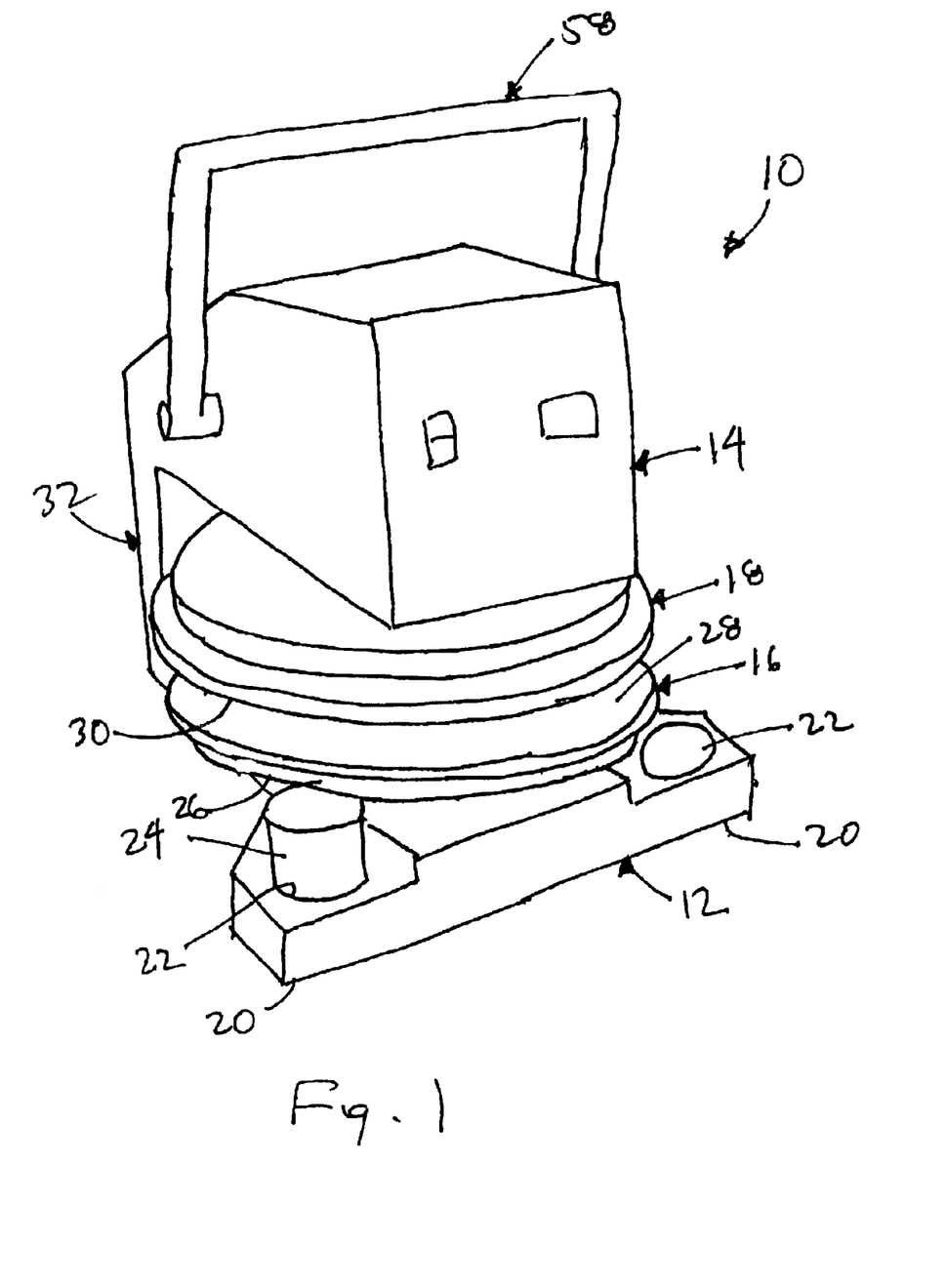
FIG. 1 is a perspective view of a dough press of the present invention.

The dough press 10 of the present invention is shown in the figures. The dough press 10 includes frame 32 that has a base 12 supporting a lower platen 16 and an upper housing 14 supporting an upper platen 18. The platens 16, 18 are supported substantially horizontally and substantially in parallel and vertical alignment with each other. The upper housing 14 includes a mechanism whereby the upper platen 18 is manually moved toward and away from the lower platen 16.

Typically, the working surface 30 of the upper platen 18 and the working surface 28 of the lower platen 16, that is, the opposed surfaces that make contact with the dough being worked, are flat. The result after pressing is a flat sheet of dough. The present invention, however, contemplates that the working surfaces 28, 30 may include grooves for forming ridges in the dough sheet or protrusions for forming depressions in the dough sheet.

As indicated, the base 12 provides support for the lower platen 16. Extending from a front corner of the base 12 is a wing 20 with a cylindrical cavity 22. The lower platen 16 has a cylindrical projection 24 offset from the platen outer edge 26 that fits within the cavity 22. The projection 24 rotates within the cavity 22 and facilitates pivoting the lower platen 16 horizontally away from the base 12, exposing the working surface 28 of the lower platen 16 so that dough can be removed from and/or placed on the lower platen 16.

Optionally, there are wings 20 with cavities 22 at both left and right front corners, as in FIG. 1. With this arrangement, the dough press 10 can be configured to allow the lower platen 16 to swing out from the left side or the right side in order to accommodate the preference of the operator.

The upper housing 14 houses the mechanism by which the operator raises and lowers the upper platen 18. As described above and shown in FIG. 2, prior art dough presses use a shaft reciprocating through a cylinder to provide stability to the platen as it is raised and lowered, the disadvantage being that the lubricant necessary for smooth operation may contaminate the working surface of the platen and the dough that is being worked.

Figure 3:
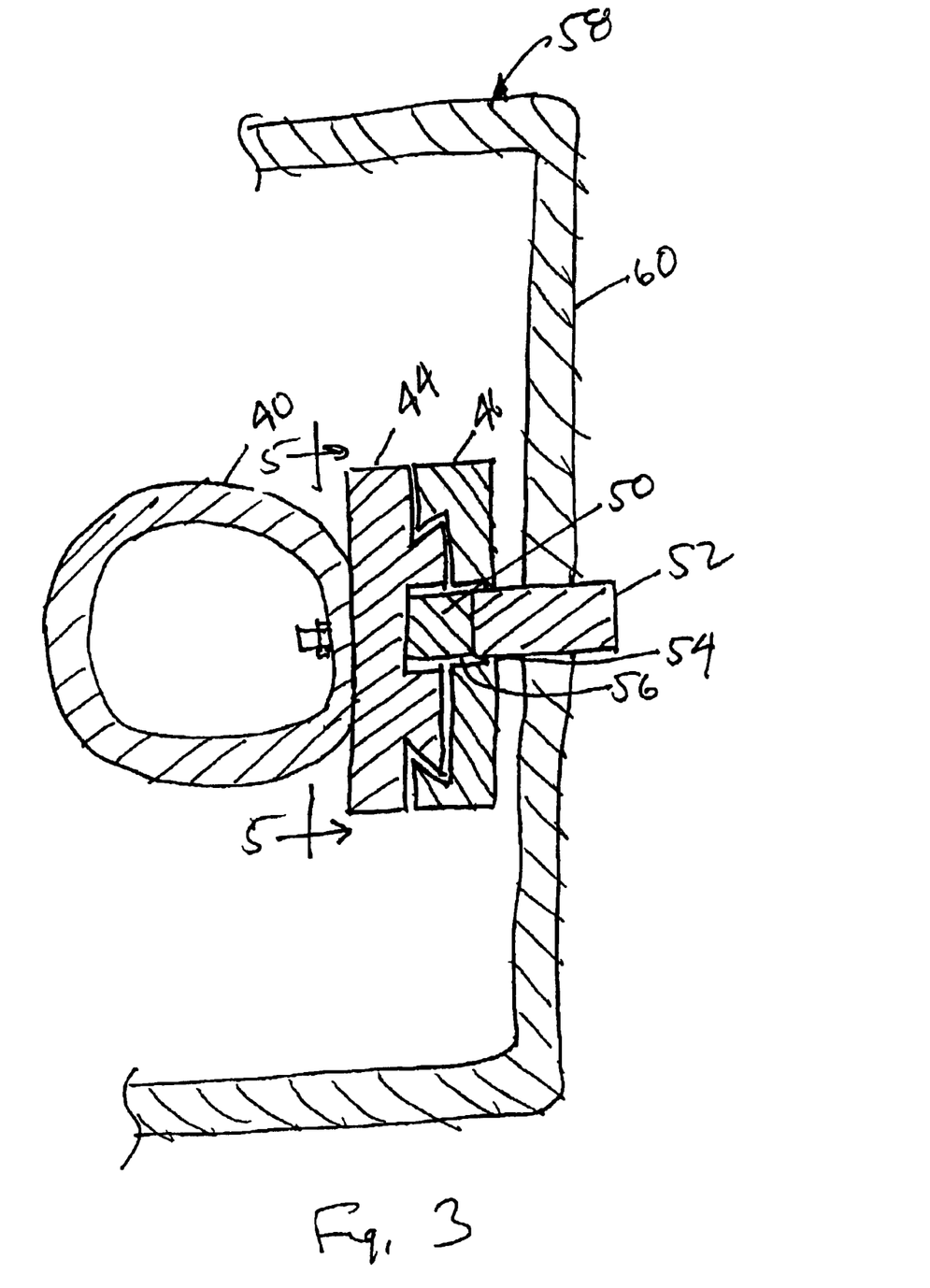
FIG. 3 is a top cross-sectional view of the platen lowering mechanism of the present invention.

One aspect of the present invention involves a solution to the above-described contamination and orientation adjustment problem. The shaft/cylinder design is replaced with an sliding interlocking design, as shown in FIG. 3. The upper platen 18 is attached to the bottom of a shaft 40 that reciprocates through a hole 42 in the bottom of the upper housing 14. A male component 44 is attached to the side of the shaft 40, a complementary female component 46 is rigidly mounted to and within the upper housing 14, wherein the male component 44 reciprocates vertically within the female component 46. The interlocking design prevents the shaft from skewing sideways as it moves vertically, keeping the operational surfaces of the platens 16, 18 parallel and aligned with each other. One requirement of the interlocking components 44, 46 is that they be long enough so that there is adequate overlap between the interlocking components 44, 46 to prevent the shaft 40 from skewing through the entire range of travel of the shaft 40. Thus, the contamination problem is solved because any lubrication that is required for smooth operation of the interlocking components is away from the shaft 40 and upper platen 18.

Figures 4, 5:
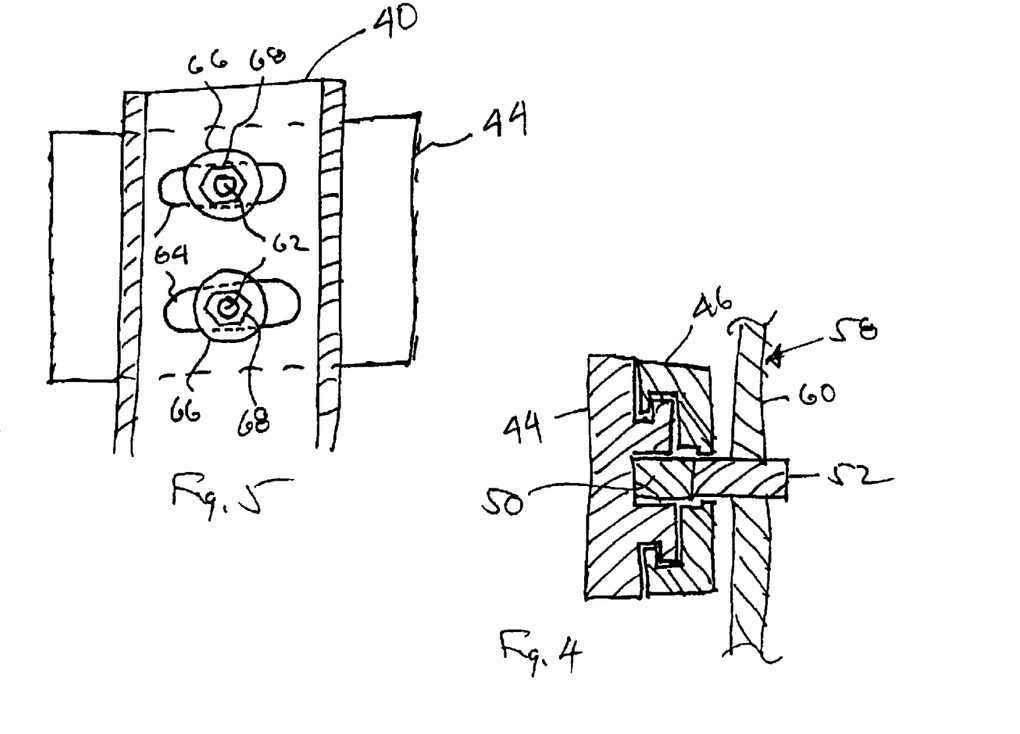
FIG. 4 is a cross-sectional view of an example of an alternative interlocking profile.
FIG. 5 is a cross-sectional, phantom view of the attachment of the reciprocating interlocking component to the upper platen shaft taken along the line 5—5 of FIG. 3.

The present invention contemplates that the interlocking components may have a different cross-sectional profile from the dovetail profile shown in FIG. 3, as long as they function in the same way as the dovetail profile. FIG. 4 shows an example of a different profile that may be employed by the present invention. The profile of FIG. 4 uses right-angle corners, rather than acute-angle corners. Another example is a profile similar to that of FIG. 4 but with rounded corners.

The above-described interlocking design indicates that the male component 44 is secured to the shaft 40 and the female component 46 is mounted in the upper housing 18. The present invention also contemplates that the components may be reversed, that is, the male component may be mounted in the upper housing and the female component may be mounted to the shaft. Thus, the remainder of the specification refers to the component mounted to the upper housing as the fixed interlocking component or the fixed component, and the component mounted to the shaft as the reciprocating interlocking component or the reciprocating component.

The problem of the ability to adjust the orientation and position of the upper platen 18 relative to the lower platen 16 is solved by mounting the reciprocating component 44 to the shaft 40 with screws through holes that are elongated rather than round. As shown in FIG. 5, a pair of threaded studs 62 extend from the reciprocating component 44 through a pair of slots 64 in the shaft 40. The reciprocating component 44 is secured to the shaft 40 by washers 66 and nuts 68. The slots 64 are significantly elongated horizontally and slightly elongated vertically compared to the diameter of the threaded studs 62. The size difference between the slots 64 and stud diameter allows adjustment in the horizontal position and angular orientation of the upper platen 18 relative to the lower platen 16.

A drive mechanism moves the shaft 40 up and down. The drive mechanism includes a rack and pinion arrangement. The rack 50 is mounted vertically to the side of the reciprocating component 44 remote from the shaft 40. As the shaft 40 moves vertically, the rack 50 slides through a groove 56 in the fixed component 46.

The pinion 52 is rigidly mounted to an axle 60. The pinion 52 meshes with the rack 50 by extending through an opening 54 in the fixed component 46. The axle 60 is driven by a handle 58 external to the housing 14 and accessible to the operator. Preferably, the handle 58 is mounted to pivot up and down, although this orientation is merely one of convenience based on ease of design, ease of use, and familiarity with dough presses of the prior art. As the operator pivots the handle 58 up or down, the pinion 52 rotates. In response, the rack 50 moves up or down, causing the shaft 40 and upper platen 18 to move up or down.

Figure 6:
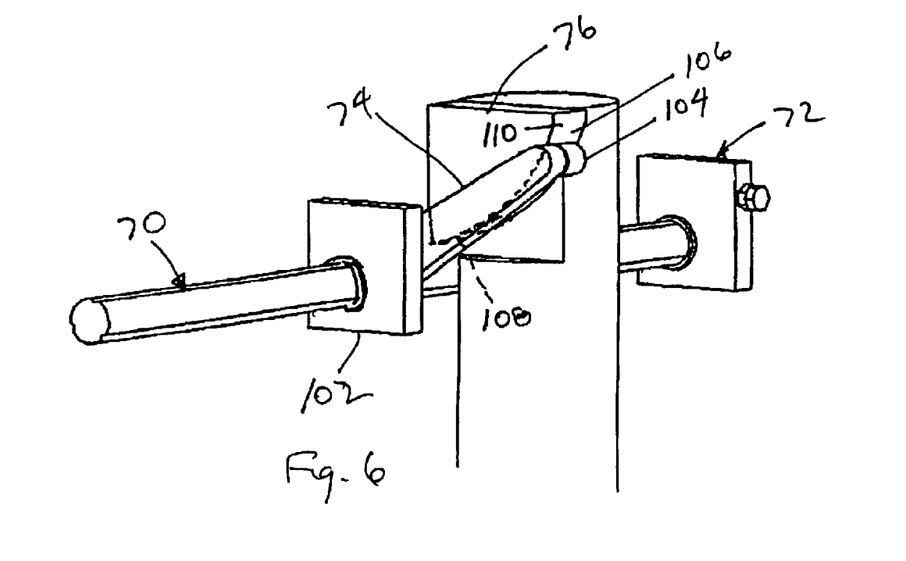
FIG. 6 is a perspective view of the counterbalance mechanism of the present invention.
Figure 7:
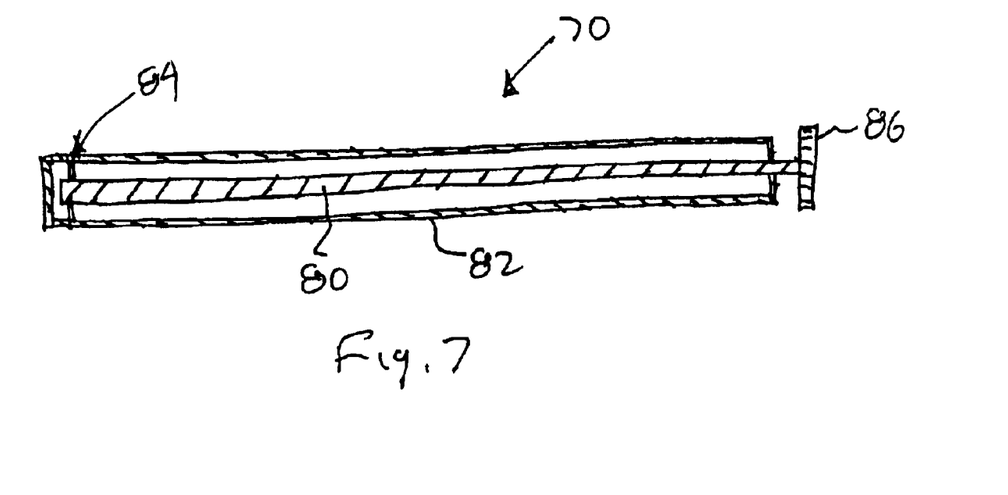
FIG. 7 is a cross-sectional view of a basic torsion spring assembly employed by the present invention.

Another aspect of the present invention is the manner in which the upper platen 18 is retained where placed by the operator. As described above, dough presses of the prior art utilize a collar tightened around the handle axle that require relatively frequent adjustment and maintenance. The present invention employs a substantially different mechanism that relies upon spring tension to maintain the desired position for the upper platen 18. As shown in FIG. 6, the counterbalance mechanism includes a torsion spring assembly 70, a terminator 72, a cam follower arm 74, and a cam 76. The torsion spring assembly 70, shown in detail in FIG. 7, consists of an elongated torsion member 80 within a sleeve 82. One end of the torsion member 80 is fixed to the sleeve 82, as at 84, and the other end of the torsion member 80 ends in a device 86 for securing the torsion member 80 to an external frame. In operation, as the sleeve 82 is rotated, it causes the torsion member 80 to twist longitudinally, increasing the stored spring energy. When the rotational force is removed, the stored energy is released, causing the torsion member 80 to return to its normal, untwisted state.

Figure 8:
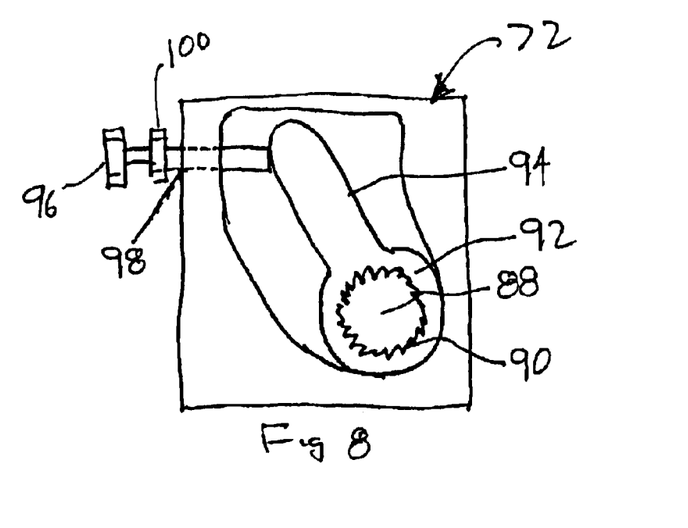
FIG. 8 is a detailed view of the torsion spring assembly adjustment mechanism.

The terminator 72 is fixed within the upper housing 14. As shown in FIG. 8, the device 86 for securing the torsion member 80 is a toothed wheel 88 that meshes with a toothed round hole 90 in a disk 92 within the terminator 72. The terminator 72 includes a mechanism for rotating the torsion member 80 in order to adjust the tension provided by the tension spring assembly 70 as needed. An arm 94 extends from the disk 92 and a screw 96 turns into and out of a threaded hole 98 in the terminator 72 to set the position of the arm 94. A locking nut 100 secures the screw 96 in position after adjustment. The tension is adjusted so that the force provided by the tension spring assembly 70 evenly counters the weight of the platen/shaft assembly. Typically, the tension only needs to be adjusted during manufacture and rarely thereafter.

Another location along the length of the torsion spring assembly 70 is rotatably secured to the upper housing 14, as at 102, to provide stability for rotation. The cam follower arm 74 is fixed to the sleeve 82 adjacent to the rotatable securement 102, extending radially from the torsion spring assembly 70. At the end of the cam follower arm 74 is a wheel 104 with an axis that is parallel to the torsion spring assembly 70. She cam 76 is secured to the upper platen shaft 40 so that it moves up and down as the handle 58 is moved up and down. The wheel 104 rides along the face 106 of the cam 76, so that, as the shaft 40 moves downwardly, the follower arm 74 pivots, causing the torsion spring assembly sleeve 82 to rotate and increasing the stored spring energy pushing against the downward motion of the shaft 40.

The nature of the torsion spring assembly 70 is that, as the rotational displacement of the sleeve 82 increases, the amount of force needed to continue to rotate the sleeve 82 increases. In other words, it is easier to rotate the sleeve 82 the first degree of displacement than it is to rotate the sleeve 82 the second degree of displacement. In order to smoothly counterbalance the upper platen 18, the cam face profile must be designed to accommodate this effects. In essence, the cam face profile must decrease the rate of rotation of the sleeve 82 as the platen 18 is lowered. A preferred profile of the cam face 106 is a quarter circle, that is, an arc of constant radius over about 90°, and oriented as shown in FIG. 6. When the upper platen 18 is at its upper travel limit, the follower arm wheel 104 contacts the inner, horizontal section 108 of the cam face 106. As the upper platen 18 is lowered, the wheel 104 moves outwardly along the cam face 106. The horizontal section 108 of the cam face 106 causes the most rotational displacement of the sleeve 82. As the wheel 104 moves farther along the cam face 106 toward the outer, vertical section 110, the rate of rotational displacement of the sleeve 82 decreases. The result is a relatively constant spring force along the entire travel of the upper platen 18.

The present invention contemplates that the cam face profile may be altered to different effect. For example, if it is desired that the upper platen 18 should not remain at its lowest travel limit without being held by the operator, the outer section 110 of the cam face 106 can be made less vertical so that the rotational displacement decrease is reduced at the lower travel limit. The result would be that, at the lower travel limit, the upward pressure exerted by the torsion spring assembly 70 would be greater than the weight of the upper plate/shaft assembly. Consequently, when the operator released the handle 58, the torsion spring assembly 70 would push the upper platen 18 upwardly a short distance until the torsion spring assembly pressure is evenly countered by the weight of the upper platen/shaft combination.

In the dough presses of the prior art, the counterbalance mechanism produces friction in both directions of movement, so the operator is not only lifting the entire weight of the platen assembly, but is also fighting the friction imposed by the collar. On the other hand, the counterbalance mechanism of the present invention operates as a "power assist" for the operator, particularly when lifting the handle 58 to separate the platens 16, 18. Release of the energy stored in the spring counters most of the weight of the upper platen 18 and shaft 40. In fact, it must do so in order for the counterbalance to operate to maintain the position of the platen 18 set by the operator. The power-assist feature is merely a corollary.

Optionally, the upper plate 18 is capable of heating the dough as it is being flattened. Heating softens the dough, making it easier to work with. There are several methods known in the art to provide heat to the platen 18, including embedded heating elements in the platen and a heating element external to and abutting the platen 18. The present invention contemplates that any method of providing heat to the upper platen 18 may be used. Optionally, the lower platen 16 is provided with the capability to heat the dough.

Thus it has been shown and described a dough press which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

We claim:

1. A manually-operated dough press for use by an operator comprising:
    (a) a frame having a base and a housing;
    (b) a lower platen attached to said base and having a working surface;
    (c) a shaft extending from said housing through an opening and mounted for reciprocating movement through said opening;
    (d) an upper platen attached to said shaft, said upper platen having a working surface opposed to, substantially parallel to, and spaced from said lower platen working surface;
    (e) a pair of mating interlocking components providing said reciprocating movement of said shaft, a first of said interlocking component within and secured to said housing, a second of said interlocking components secured to said shaft within said housing and arranged for said reciprocating movement within said first of said interlocking components; and
    (f) a drive mechanism including a handle accessible to said operator for controlling the operation of said reciprocating movement of said shaft.

2. The dough press of claim 1 wherein said interlocking components interlock with a dovetail profile.

3. The dough press of claim 1 wherein said second interlocking component is secured to said shaft by a pair of threaded studs extending from said second interlocking component through slots in said shaft, said slots being significantly elongated horizontally and slightly elongated vertically relative to the diameter of said threaded studs.

4. The dough press of claim 1 wherein said drive mechanism includes a rack attached to said second interlocking component, a complementary pinion meshing with said rack and attached to an axle rotatably mounted in said housing, said handle being attached for rotating said axle.

5. The dough press of claim 1 wherein said dough press further comprises a counterbalance for maintaining the position of said upper platen relative to said lower platen as set by said operator.

6. The dough press of claim 5 wherein said counterbalance includes a torsion spring assembly mounted within said housing, a cam secured to said shaft and having a cam face, and a cam follower arm attached to said torsion spring assembly and having an end remote from said torsion spring assembly, said cam follower arm remote end riding on said cam face, such that, as said upper platen moves toward said lower platen, said cam pushes said follower arm, causing stored spring energy in said spring torsion assembly to increase, and as said upper platen moves away from said lower platen, said stored spring energy transfers through said follower arm to aid movement of said upper platen away from said lower platen.

7. The dough press of claim 6 wherein said torsion spring assembly is adjustably mounted to said housing such that said stored spring energy is adjustable.

8. The dough press of claim 1 wherein said lower platen is pivotally mounted such that said lower platen can be pivoted outwardly from alignment with said upper platen to facilitate access to said lower platen working surface.

9. A manually-operated dough press for use by an operator comprising:
    (a) a frame having a base and a housing;
    (b) a lower platen attached to said base and having a working surface;
    (c) a shaft extending from said housing through an opening and mounted for reciprocating movement through said opening;
    (d) an upper platen attached to said shaft, said upper platen having a working surface opposed to, substantially parallel to, and spaced from said lower platen working surface;
    (e) a pair of mating interlocking components providing said reciprocating movement of said shaft, a first of said interlocking component within and secured to said housing, a second of said interlocking components secured to said shaft within said housing and arranged for said reciprocating movement within said first of said interlocking components;
    (f) said second interlocking component being secured to said shaft by a pair of threaded studs extending from said second interlocking component through slots in said shaft, said slots being significantly elongated horizontally and slightly elongated vertically relative to the diameter of said threaded studs;

(g) a drive mechanism including a rack attached to said second interlocking component, a complementary pinion meshing with said rack and attached to an axle rotatably mounted in said housing, and a handle attached to said axle and accessible to said operator for control of said reciprocating movement of said shaft; and (h) a counterbalance for maintaining the position of said upper platen relative to said lower platen as set by said operator.

10. The dough press of claim 9 wherein said interlocking components interlock with a dovetail profile.

11. The dough press of claim 9 wherein said counterbalance includes a torsion spring assembly mounted within said housing, a cam secured to said shaft and having a cam face, and a cam follower arm attached to said torsion spring assembly and having an end remote from said torsion spring assembly, said cam follower arm remote end riding on said cam face, such that, as said upper platen moves toward said lower platen, said cam pushes said follower arm, causing stored spring energy in said spring torsion assembly to increase, and as said upper platen moves away from said lower platen, said stored spring energy transfers through said follower arm to aid movement of said upper platen away from said lower platen.

12. The dough press of claim 11 wherein said torsion spring assembly is adjustably mounted to said housing such that said stored spring energy is adjustable.

13. The dough press of claim 9 wherein said lower platen is pivotally mounted such that said lower platen can be pivoted outwardly from alignment with said upper platen to facilitate access to said lower platen working surface.

* * * * *